(12) United States Patent
Nakamura

(10) Patent No.: US 9,158,986 B2
(45) Date of Patent: Oct. 13, 2015

(54) CHARACTER SEGMENTATION DEVICE AND CHARACTER SEGMENTATION METHOD

(71) Applicant: NIDEC SANKYO CORPORATION, Nagano (JP)

(72) Inventor: Hiroshi Nakamura, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/174,424

(22) Filed: Feb. 6, 2014

(65) Prior Publication Data

US 2014/0219561 A1    Aug. 7, 2014

(30) Foreign Application Priority Data

Feb. 6, 2013   (JP) .................. 2013-021483

(51) Int. Cl.
   *G06K 9/34* (2006.01)
   *G06K 9/00* (2006.01)
   *G06K 9/46* (2006.01)

(52) U.S. Cl.
   CPC ............ *G06K 9/344* (2013.01); *G06K 9/00442* (2013.01); *G06K 9/4647* (2013.01); *G06K 2209/01* (2013.01)

(58) Field of Classification Search
   None
   See application file for complete search history.

(56) References Cited

U.S. PATENT DOCUMENTS

| | | | | |
|---|---|---|---|---|
| 5,889,885 A | * | 3/1999 | Moed et al. | 382/172 |
| 6,327,384 B1 | * | 12/2001 | Hirao et al. | 382/173 |
| 6,549,658 B1 | * | 4/2003 | Schweid et al. | 382/173 |
| 6,941,013 B1 | * | 9/2005 | Drayer | 382/168 |
| 7,065,261 B1 | * | 6/2006 | Horie | 382/289 |
| 2001/0017945 A1 | * | 8/2001 | Horie | 382/284 |
| 2007/0211964 A1 | * | 9/2007 | Agam et al. | 382/305 |
| 2008/0063273 A1 | * | 3/2008 | Shimodaira | 382/171 |
| 2008/0181500 A1 | * | 7/2008 | Ito et al. | 382/177 |
| 2013/0294653 A1 | * | 11/2013 | Burry et al. | 382/105 |
| 2014/0185106 A1 | * | 7/2014 | Nakamura | 358/462 |

FOREIGN PATENT DOCUMENTS

JP    2008-234291 A    10/2008

OTHER PUBLICATIONS

Yan Solihin and C.G. Leedham, 'The Multi-stage Approach to Grey-Scale Image Thresholding for Specific Applications', School of Computer Engineering, Nanyang Technological University, Singapore, 2002.*

* cited by examiner

*Primary Examiner* — Andrae S Allison
(74) *Attorney, Agent, or Firm* — Cantor Colburn LLP

(57) ABSTRACT

A character segmentation section, for segmenting characters of a character line may include a minimum pixel-value curve creating section configured to extract a smallest pixel value in pixels composing a pixel line arranged in a direction orthogonal to a character line direction in said multi-level image data and create a minimum pixel-value curve, a character partitioning position determining section configured to determine partitioning positions of said characters, based on said minimum pixel value curve, a binarization processing section configured to detect a minimum pixel value indicating said linear drawing from said minimum pixel-value curve, acquires a binarization threshold based on said minimum pixel value, and binarizes said multi-level image data using said binarization threshold, and a character segmentation implementing section configured to extract the image data of each character.

6 Claims, 7 Drawing Sheets

CHARACTER SEGMENTATION DEVICE AND CHARACTER SEGMENTATION METHOD

CROSS REFERENCE TO RELATED APPLICATION

The present invention claims priority under 35 U.S.C. §119 to Japanese Application No. 2013-021483 filed Feb. 6, 2013, the entire contents of which is incorporated herein by reference.

FIELD OF THE INVENTION

At least an embodiment of the present invention relates to a character recognition technique that recognizes a character line by processing image data obtained by imaging a character line printed on an information recording medium such as paper or plastic, and in particular relates to a character segmentation device that recognizes characters by searching the partitioning positions in the character line in the scanned image and a character segmentation method.

BACKGROUND

Conventionally known is a technique that reads items printed on an information recording medium (hereinafter denoted as a "medium") of a cash card and various ID cards such as an employee ID card, a student ID card, an alien registration card and a driver's license, as image data with an OCR (Optical Character Recognition) process to implement a character recognition of the printed items. In a general OCR processing, the characters on a medium are optically read by a scanner, the scanned character image is segmented, a pattern matching is implemented between the image of the segmented character and a character pattern prepared in advance, and the character pattern that best matches the segmented character is extracted to recognize the image of each character.

In general, for a character recognition in the OCR processing, the line segmentation position (the segmenting position of the character line) is specified and the partitioning positions between characters are specified in the character line whose position was determined, to segment each character in the character line. Also there are cases in various ID cards that the area on the medium, in which characters are printed, has a character line decorated with a linear drawing (such as an underline or a repeated pattern with dots, lines or half-tone in its background). In a general OCR processing, when a linear drawing is present in the area in which characters are printed, the characters may be segmented at wrong positions and therefore, the characters may not be recognized. Even if the character can be recognized, the general OCR process may be affected by the linear drawing present in the area in which characters are printed, remarkably degrading the accurate recognition rate of the characters. For this reason, the removal of the linear drawing has been performed conventionally when the image including the characters to be recognized contains a linear drawing.

Conventionally as a character segmentation device for segmenting each character from the character line in which a linear drawing is present in the character (writing) area, a technique is disclosed that, for character recognition of a driver's license number having oblique lines in the background of the character line, accurately and effectively reads the fifth to the eighth characters having oblique lines in the background (see Patent Reference 1). The character segmentation device disclosed in Patent Reference 1, in the image of the driver's license read by a scanner, rotates the image of each of the fifth to eighth characters having oblique lines in the background at the angle at which the oblique lines become horizontal, removes the black pixel components composing the lines in the horizontal direction (the oblique line components) from the rotated character image and extracts the feature vector of the character image to implement a character recognition using a secondary dictionary exclusively set for the rotated character image.

PATENT REFERENCE

[Patent reference 1] Unexamined Japanese Patent Application 2000-234291 Publication However, in the character segmentation device disclosed in Patent Reference 1, the operation of rotating the character image having oblique lines in its background is needed; in other words, the processing time for coordinate transformation is greatly increased. Also, in the character segmentation device disclosed in Patent Reference 1, a dictionary for rotated characters (a secondary dictionary) needs to be provided in addition to a standard character dictionary, requiring an extra storage area. Further, the characters having oblique lines are rotated 45 degrees to make the oblique lines horizontal and then the horizontal lines are removed from the feature vector to eliminate the influence of the oblique lines; however, depending on the condition of the oblique lines or the character print position, it cannot be masked completely, leaving a possibility of unstable comparison with the dictionary.

The above-described character segmentation device results in a complex configuration to implement complex operations, and thus the processing time is increased. Consequently, the character segmentation device disclosed in Patent Reference 1 cannot obtain a sufficient processing speed unless a (large) computer with performance higher than a conventional one is used; in other words, a sufficient processing speed cannot be realized by using a conventional (relatively small) computer (such as a personal computer).

SUMMARY

Then, at least an embodiment of the present invention is provides a character segmentation device that, even when reading characters on a medium such as an ID card having a linear drawing present in the character printed area, is capable of segmenting characters accurately with a simple configuration and satisfies a demand for real-time processing, and a character segmentation method.

To solve the above-mentioned problems and achieve the above, at least an embodiment of the present invention provides the following:

(1) A character segmentation device which processes multi-level image data acquired by imaging a character line, in which a linear drawing is present, on an information recording medium and has a character segmentation section to segment characters that compose the character line, wherein the character segmentation section has a minimum pixel-value curve creating section which creates a minimum pixel-value curve by extracting the minimum pixel value in the pixels composing the pixel line arranged in the direction orthogonal to the character line direction in the multi-level image data, a character partitioning position-determining section which determines the partitioning position of the character based on the minimum pixel-value curve, a binarization processing section which detects the minimum pixel value indicating the linear drawing from the minimum pixel-value curve, acquires a binarization threshold based on this minimum pixel value and binarizes the multi-level image data, using the binarization threshold, and a character segmentation implementing section which extracts the image data of each character.

According to at least an embodiment of the present invention, in the multi-level image data acquired by imaging the character line, in which a linear drawing is present, the minimum pixel-value curve creating section extracts a minimum pixel value in the pixels composing the pixel line arranged in the direction orthogonal to the character line direction to create a minimum pixel-value curve; based on the minimum pixel-value curve, the character partitioning position determining section determines the partitioning positions; the binarization processing section detects the minimum pixel value indicating the linear drawing and binarizes the multi-level image data using the binarization threshold obtained from this minimum pixel value; and the character segmentation implementing section extracts the image data of each character; therefore, even if a linear drawing is present in the character writing area when the character printed on the information recording medium such as an ID card is read, an accurate character segmentation is made possible with a simple configuration.

The character segmentation device of at least an embodiment of the present invention is capable of segmenting characters with certainty without a processing with large operation load such as coordinate transformation even if a linear drawing is present in the character writing area; therefore, a real-time processing demand can be satisfied even when using a relatively small computer such as a personal computer.

(2) The binarization processing section detects the minimum pixel value of the minimum pixel-value curve for the blank space provided between characters and binarizes the multi-level image data using this minimum pixel value as a binarization threshold.

According to at least an embodiment of the present invention, the binarization processing section detects the minimum pixel value of the minimum pixel-value curve for the blank space provided between characters; therefore, even if a linear drawing such as oblique lines or a pattern is present in the blank space, the minimum pixel value of the portion having the linear drawing can be acquired, and by binarizing the multi-image data using this minimum pixel value as binarization threshold, it is guaranteed that the value of the pixels composing the linear drawing is above the binarization threshold and therefore, the pixels composing the linear drawing will not be mapped in a black area. Thus, the linear drawing present in the background in the blank space can be removed with certainty through binarization, and thus binarization desirable for character recognition can be implemented.

(3) The character partitioning position-determining section calculates a temporary binarization threshold for binarization of the multi-image data and determines the boundary between the character space in which a character is printed and the blank space existing between characters, based on the binary image data.

According to at least an embodiment of the present invention, the character partitioning position-determining section calculates a temporary binarization threshold for binarization of the multi-level image data and determines the boundary between the character space in which a character is printed and the blank space existing between characters, based on this binary image data; therefore, even if a linear drawing is present in the character writing area, the boundary between the character space and the blank space can be determined with certainty.

(4) A character segmentation method for processing multi-level image data acquired by imaging a character line on an information recording medium, in which a linear drawing is present, to segment characters composing the character line, comprising a minimum pixel value-creating step in which a minimum pixel-value curve is created by extracting the minimum pixel value in the pixels composing the pixel line arranged in the direction orthogonal to the character line direction in the multi-level image data, a character partitioning position-determining step in which the partitioning positions of the characters are determined based on the minimum pixel-value curve, a binarization processing step in which the minimum pixel value indicating the linear drawing is detected from the minimum pixel-value curve, a binarization threshold is acquired based on the minimum pixel value and the multi-level image data is binarized using the binarization threshold, and a character segmentation step in which the image data is extracted for each character.

According to at least an embodiment of the present invention, with respect to the multi-level image data acquired by imaging a character line in which a linear drawing is present, a minimum pixel-value curve is created by extracting the minimum pixel value in the pixels composing the pixel line arranged in the direction orthogonal to the character line direction in a minimum pixel value-creating step, the partitioning positions of the characters are determined based on the minimum pixel-value curve in a character partitioning position-determining step, a minimum pixel value indicating the linear drawing is detected, a binarization threshold is acquired based on the minimum pixel value, and the multi-level image data is binarized using the binarization threshold in a binarization processing step, and the image data is extracted for each character in a character segmentation step; therefore, even if a linear drawing is present in the character writing area when the characters printed on the information recording medium such as an ID card is read, an accurate character segmentation is made possible with a simple configuration.

By the character segmentation method of at least an embodiment of the present invention, characters can be segmented with certainty, even if a linear drawing is present in the character printed area, without a processing with a large operation load such as a coordinate transformation.

(5) In the binarization processing step, a minimum pixel value in the minimum pixel-value curve for the blank space existing between characters is detected and the multi-level image data is binarized using the minimum pixel value as binarization threshold.

According to at least an embodiment of the present invention, the minimum pixel value of the minimum pixel-value curve for the blank space existing between characters is detected in the binarization processing step; therefore, even if a linear drawing such as oblique lines or a pattern is present in the blank space, the minimum pixel value of the portion in which a linear drawing is present can be acquired, and by binarizing the multi-level image data using the minimum pixel value as binarization threshold, it is guaranteed that the value of the pixels composing the linear drawing is above the binarization threshold and therefore, the pixels composing the linear drawing will not be mapped in a black area. Thus, the linear drawing present in the background can be removed with certainty through binarization, and thus binarization desirable for character recognition can be implemented.

(6) In the character segmentation processing step, a temporary binarization threshold is calculated for binarization of the multi-level image data and the boundary between the character space in which a character is printed and the blank space provided between the characters is determined based on the binary image data.

According to at least an embodiment of the present invention, in the character segmentation processing step, a temporary binarization threshold is calculated for binarization of the multi-level image data and the boundary between the character space in which a character is printed and the blank space between the adjacent characters is determined based on the binary image data; therefore, even if a linear drawing is present in the character printed area, the boundary between the character space and the blank space can be determined with certainty.

According to at least an embodiment of the present invention, when a character line on an ID card such as a driver's license, in which a linear drawing is present, is read as multi-level image data for character recognition, the smallest pixel value is extracted from the pixels composing the pixel line arranged in the direction orthogonal to the character line direction to create the minimum pixel-value curve, the minimum pixel value indicating the linear drawing is detected from the minimum pixel-value curve, a binarization threshold is acquired based on this minimum pixel value and then the multi-value image data is binarized; therefore, even if a linear drawing is present in the character printed area, accurate character segmentation is made possible with a simple configuration, satisfying a demand for real-time processing.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
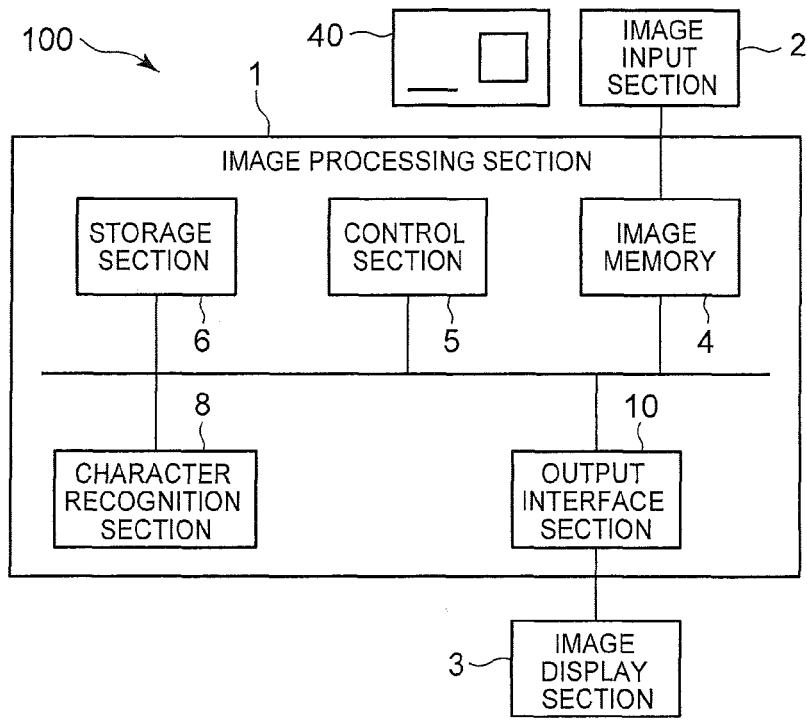
FIG. 1 is an overall configuration of a character recognition device as a character segmentation device of an embodiment of the present invention.

The detailed description of at least an embodiment of the present invention is made hereinafter referring to the drawings.

FIG. 1 is a block diagram showing an overall configuration of a character recognition device as a character segmentation device of this embodiment.

In FIG. 1, code 100 is a character recognition device which is configured by a data processing section 1 for implementing a character recognition process on images, an image input section 2 such as a scanner by which an image is input, and an image display section 3 for displaying the processed image.

In the data processing section 1, code 4 is an image memory in which the image data input from the image input section 2 is stored. Code 5 is a control section configured by a CPU or the like, by which the image data is produced according to the signals supplied by the image inputting section 2. Code 6 is a storage section configured by a RAM (Random Access Memory), a ROM (Read Only Memory) or an HDD (Hard Disk Drive) for storing the image data or the like. In the storage section 6, stored is the information of the areas to extract the image of each item such as name, address, license number, etc. (hereinafter denoted as "image data extracting information"). Also, in the storage section 6, the information used to determine which item image data is selected (hereinafter denoted as "item selecting data") is stored.

Code 8 is a character recognition section in which a character recognition is performed on the area extracted as a character printed area. Code 10 is an output interface (I/F) section which is an interface with respect to the image display 3. Note that the processing at the character recognition section 8 may be realized by executing a computer program stored in the storage section 6.

The image input section 2 performs an image reading with respect to a driver's license based on the reflected light of the light irradiated on the driver's license 40. The image input section 2 has a close-contact type 1D imaging device (no illustration) such as a CCD line sensor which performs photoelectric conversion to convert the intensity of the reflected light into analog electrical signals, an ND converter (no illustration) which converts the analog electrical signals into the 256 grayscale multi-level (digital) image data, and a pre-processing section which implements pre-processing operations such as noise removal, image smoothing (a process to remove small fluctuations in the gray level of every pixel for a smooth image) and image sharpening (a process to emphasize the change in the gray level of the image). The image display section 3 is equipped with a display panel such as a display. Note that the image display section 3 may be configured by a printer in place of the display panel.

Figure 2:
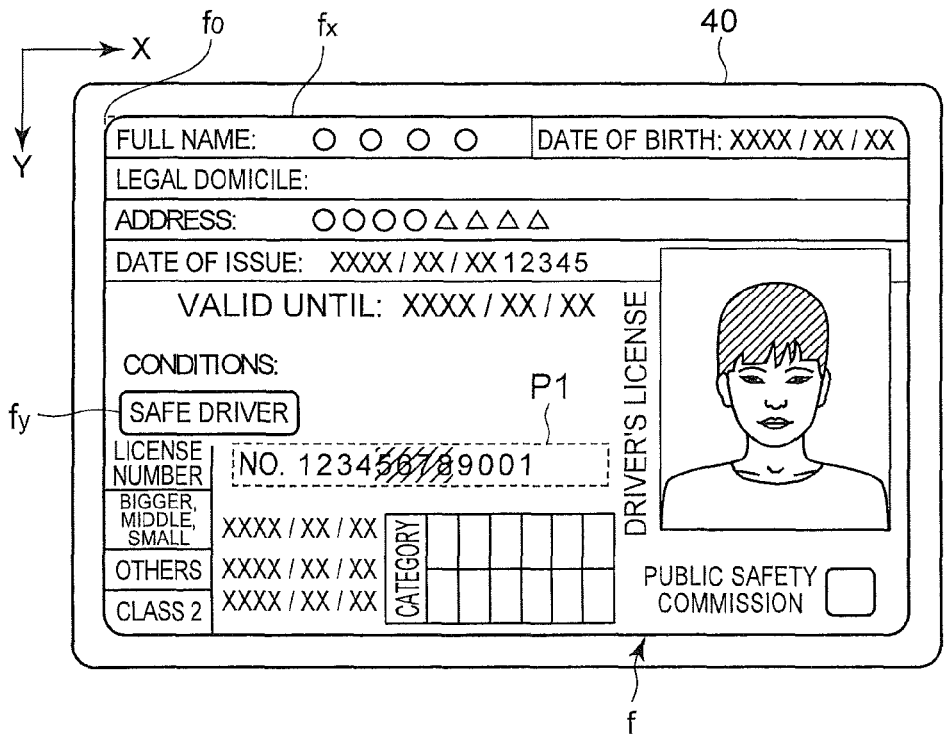
FIG. 2 is a figure of an example of the image of a driver's license.

FIG. 2 shows an example of the image of a driver's license 40. As shown in the figure, the driver's license 40 has various information such as driver's name, address, and date of birth within a frame line, f, and also the license number ("'Dai 123456789001 Go'" in FIG. 2) is printed as an identification number (an identification character line).

Figure 11:
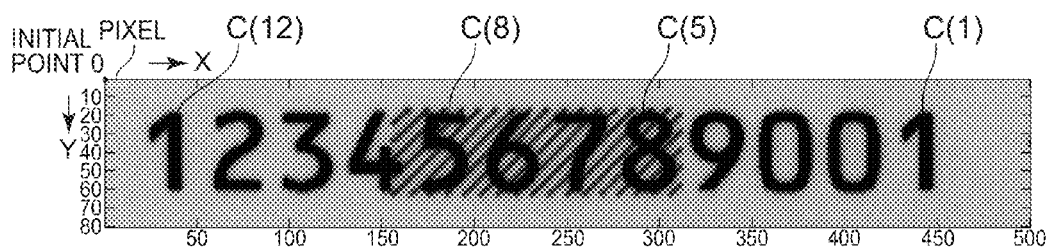
FIG. 11 is an explanatory diagram of an example of the image of a driver's license number.

Identification characters are identical in character size (width and height) and a space (a space interval) is provided between characters. The license number on the driver's license 40 is an example. The identification character includes characters, numbers, symbols, etc. In this embodiment, as shown in FIG. 2 and FIG. 11, the numbers from the 5th digit c(5)="8" to the eighth digit c(8)="5" are shaded with red-colored oblique lines. For this reason, this shaded portion has a low intensity of the reflected light; therefore, its multi-level image data shows a value brighter than 0 which indicates black.

[Character Recognition Section]

Figure 3:
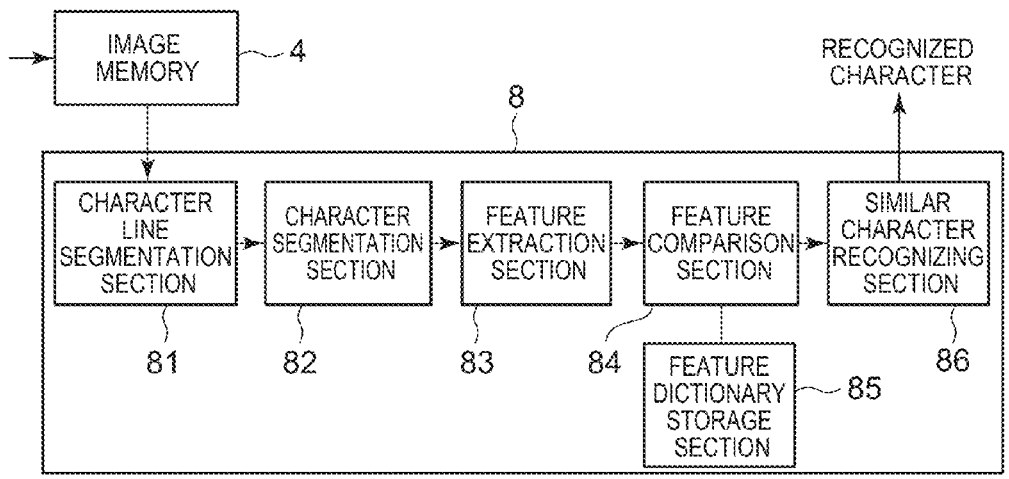
FIG. 3 is a block diagram of a functional configuration of a character recognition section of the character recognition device.

FIG. 3 is a block diagram of a functional configuration of the character recognition section 8 in the character recognition device.

The character recognition section 8 has a character line segmentation section 81, a character segmentation section 82, a feature extracting section 83, a feature comparison section 84, a feature dictionary storage section 85 and a similar character recognition section 86, and recognizes characters in the image read by the image input section 2. Note that each section functions as an example of the character line recognition means for recognizing the character line on the driver's license 40.

The character line segmentation section 81 selects an item according to the item selection information (the license number area P1) stored in the storage section 6 and also specifies the area corresponding to the selected item according to the image data extraction information stored in the storage section 6. The character line segmentation section 81 reads the image data corresponding to the specified area from the image memory 4. Also, in this embodiment, the image data is a multi-level (256 levels) grayscale image. Note that the image memory 4 may be any type as long as the image data can be stored, such as a RAM, an SDRAM, a DDRSDRAM, or a RDRAM. The character line segmentation section 81 detects the distribution of the reflected light in the area in which the identification character line should be printed in the image read by the image input section to detect the image data of the character line. The character line segmentation section 81 is an example of the detection section of the character segmentation device.

Figure 4:
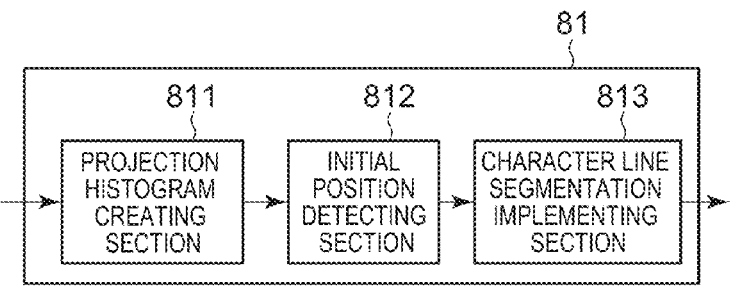
FIG. 4 is a block diagram of a functional configuration of a character line segmentation section of the character recognition device.

FIG. 4 is a block diagram of the functional configuration of the character line segmentation section in the character recognition device.

As shown in FIG. 4, the character line segmentation section 81 is equipped with a projection histogram creating section 811, an initial position detecting section 812 and a character line segmentation implementing section 813. Further, the projection histogram creating section 811 has an X-axis projection histogram creating section and a Y-axis projection histogram creating section. Also, the initial position detecting section 812 has a frame line detecting section for detecting a frame line f of the driver's license 40 (the line component fx extending in the X-axis direction and the line component fy extending in the Y-axis direction) and an initial position detecting section for detecting the pixel that indicates the point of intersection f0 on the extensions of the line component fx and the line component fy. For example, one pixel has 256 gray scale (8-bit) brightness values from "0" (black pixel) to "255" (white pixel). The pixel on the upper left corner in the image data is the initial point (0, 0). Using the coordinates of X and Y starting at the pixel in the initial point, the pixel positions (coordinates) on the four corners of the area P1 in which the license number is printed, are set.

The projection histogram creating section 811 of the character line segmentation section 81 detects the frame f that indicates the information recording area in the driver's license 40 by calculating the gray level histogram in the horizontal direction and the perpendicular direction. Note that, if the frame f is not present in the driver's license 40, the character line segmentation section 81 may detect the edge around the driver's license 40. Also, a guide surface of a transporting means (the surface on which the driver's license 40 is placed) may be colored to differentiate clearly the border position from the driver's license. Note that the projection histogram creating section 811 may set a bounding rectangular area and obtain the position of the character line in the height direction to segment the character line.

The character line segmentation implementing section 813 extracts the multi-level image data of the pre-set license number area P1 from the image memory 4. Based on the pixel positions of the frame f detected at a projection calculation section (no illustration), the image data extracting section (no illustration) specifies the positions of the pixels at four corners of the license number area P1. The character line segmentation implementing section 813 calculates the range between the outward line of the driver's license 40 and the frame line f indicating the information recording area and its vicinity. Note that, in this embodiment, the rectangular image shown in FIG. 11 is explained using the license number "123456789001" printed between the Chinese characters "Dai" and "Go" in the license number area P1.

Figure 5:
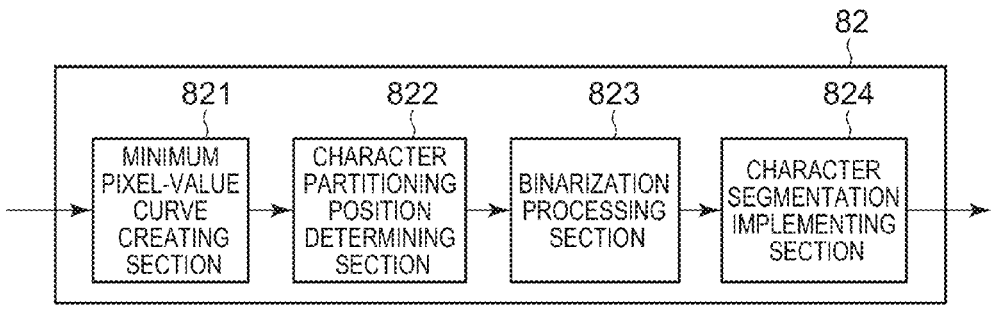
FIG. 5 is a block diagram of a functional configuration of a character segmentation section of the character recognition device.

FIG. 5 is a block diagram of the functional configuration of the character segmentation section in the character recognition device.

The character segmentation section 82 performs a projection calculation in the perpendicular direction on the image data of the character line detected by the character line segmentation section 81. Then, using the acquired perpendicular projection profile, the character segmentation section 82 identifies blank spaces (space intervals) between characters and segments the characters. Note that the detail of the segmentation is described later. Through this processing, a bounding rectangle area of a character (the coordinate values at the top, bottom, left and right) which is a subject to be recognized, is acquired.

The character segmentation section 82 is equipped with a minimum pixel-value curve creating section 821, a character partitioning position determining section 822, a binarization processing section 823 and a character segmentation implementing section 824.

Figure 12:
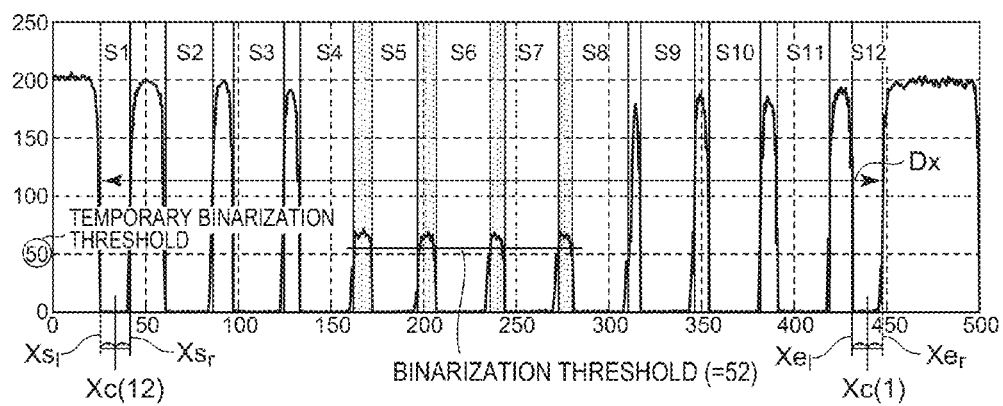
FIG. 12 is a graph showing an example of a projection pattern calculated from the image of the character line of the driver's license number.

As shown in FIG. 11, using the image data of the segmented license number area P1 the minimum pixel-value curve creating section 821 extracts the smallest pixel value from the pixel line arranged in the perpendicular direction (Y-axis direction) orthogonal to the character line direction (X-axis direction) and creates the minimum pixel-value curve as shown in FIG. 12. Using the curve calculated at the minimum pixel-value curve creating section 821, the character segmentation section 82 segments the positions of the numbers (characters) at both ends, the constituents of the license number (character line) from the license number area P1.

The minimum pixel-value curve creating section 821 detects the end positions of the character line from the smallest pixel values in the pixel line arranged in the perpendicular direction (Y-axis direction) orthogonal to the horizontal direction (X-axis direction). In other words, the smallest pixel value is detected in the pixels (pixel line) arranged in the Y-axis direction (in the perpendicular direction) in a certain position Xa on the X-axis, and acquires this smallest pixel value as the minimum pixel value in this position Xa. More specifically described, in the pixel line in which characters are printed, if even one pixel has a pixel value of 0, which indicates black, the smallest pixel value in that position is 0 and the smallest pixel value in a pixel line in which no characters are printed is white (255). The minimum pixel-value curve in FIG. 12 shows the minimum pixel value acquired for each pixel line in the X-axis direction.

The character partitioning position determining section 822 detects the position of each character composing the character line and extracts each character. More specifically described, the characters positioned at both ends of the character line are extracted. The character partitioning position determining section 822 detects a mid-point of each of the extracted end characters, obtains the difference between the mid-point of the character on the left end and the mid-point of the character on the right end, and divides the difference by the number which is obtained by subtracting 1 from "the number of characters in the character line". In this embodiment, the character line is a license number which consists of twelve characters; therefore, the difference is divided by 11 to detect the mid-point of each character. In this embodiment, the character partitioning position determining section 822 has a temporary binarization threshold calculating section, which calculates a temporary binarization threshold based on the multi-level image data in the item selection information (the license number area P1), an end characters-extracting section, which extracts the characters positioned at both ends of the license number printed in the item selection information (the license number area P1), a character mid-point detection section, which detects the mid-point of each of the characters composing the character line printed in the item selection information (the license number area P1), a character edges-detecting section, which detects both edges of each character, and a character counting section, which counts the number of all characters in the character line printed in the item selection information (the license number area P1).

As mentioned, the character partitioning position determining section 822 is equipped with the character edges-detecting section (no illustration) and the character counting section (no illustration). The character edges-detecting section detects both edges of each character from the second character from the left to the character before the last on the right end. The character counting section judges whether or not both edges of each character is within a predetermined range (the character width). In this embodiment, the character number counting section judges whether or not the number of characters in the area in which the identification character line is printed agrees with a predetermined number, according to the number of the segmented characters. When the character number counting section judges that the number of characters in the area of the identification character line agrees with the predetermined number, it determines that the direction of the image of the driver's license 40 is in the erected direction.

The binarization processing section 823 detects the multi-level image data indicating a linear drawing in the character line in the character printed area, which is decorated with a linear drawing (such as an underline or a regulated pattern of dots, lines or a halftone dot meshing in the background of the characters given to emphasize the characters written on the medium). In this embodiment, the binarization processing section 823 has a minimum pixel-value detecting section and a binarization threshold calculating section. Such a binarization processing section 823, using the multi-level image data of the segmented item selection information (the license number area P1), extracts the smallest pixel value from the pixel line arranged in the perpendicular direction (Y-axis direction) orthogonal to the character line direction (X-axis direction) to create a minimum pixel-value curve. The smallest pixel value is detected in the minimum pixel-value curve for the area of the linear drawing and binarization processing is implemented using this smallest pixel value as binarization threshold.

In FIG. 3, the feature extracting section 83 divides the area of one character of the above-described segmented characters into arbitrary sub sections (for example, the area of the segmented one character is divided into 5×5 sections, each of which is defined as a sub section), and the ratio of the number of the black pixels to the total number of all the pixels of the section is acquired for each sub section, and then a feature vector having those elements is created.

The feature comparison section 84 compares the feature vector acquired at the feature extracting section 83 with a reference feature vector which is acquired in advance for all the characters which are to be used on this medium, and sets the character having the highest similarity (for example, a normalized correlation coefficient) as a character candidate for the character. Note that the reference feature vector is stored in the feature dictionary storage section 85 and the data of the character having the high similarity is read from the feature dictionary storage section 85 for feature comparison.

The similar character recognition section 86 recognizes the character candidate which is set by the feature comparison section 84 as the character used on the medium. Note that, when there are multiple character candidates having a similarity exceeding a fixed value, character recognition cannot be done; therefore, at the similar character recognition section 86, the similar characters are judged by using secondary feature values which can be derived from the feature vector. For instance, the arbitrarily divided sub sections may be divided into two areas (a left half and a right half) about a vertical symmetry to create partial feature vectors, and then the similarity among those vectors may be analyzed; alternately, the arbitrarily divided sub sections may be divided into two areas (a top half and a bottom half) about a horizontal symmetry and then the similarities may be analyzed. Also, in the same manner as the vertical symmetry and the horizontal symmetry, the similarities may be analyzed by a point symmetry.

[Overall Operation of Character Recognition Device]

Figure 6:
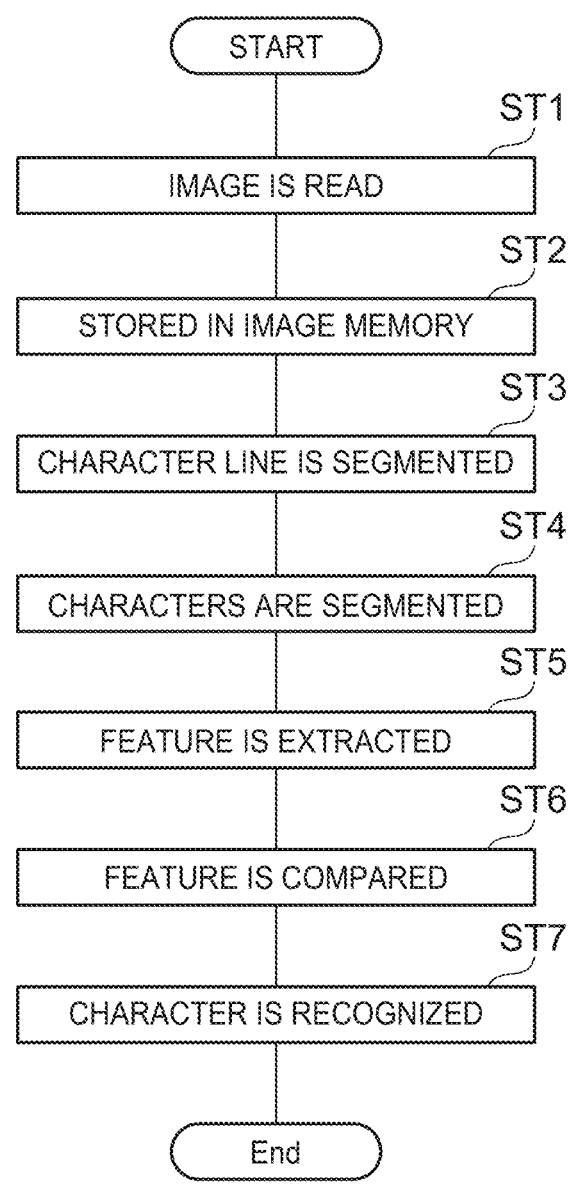
FIG. 6 is a flowchart to explain the operation of the character recognition device as the character segmentation device of the present embodiment.

Next, the overall operation of the character recognition device of this embodiment is described associating with FIG. 6. FIG. 6 is a flowchart to explain the operation of the character recognition device which is the character segmentation device of this embodiment.

The character recognition device 100 implements a character recognition processing in which the license number consisting of 12 characters printed on the driver's license 40 is read and converted to a character code. This processing begins when the driver's license 40 is inserted to the image input section 2 shown in FIG. 1. The image input section 2 has an insertion opening (no illustration) into which the driver's license 40 is inserted; as the driver's license 40 is inserted to the image input section 2 by a user, the inserted license card is transported along a transport guide which is a medium transporting mechanism (no illustration), the reflected light of the card passing an imaging device (no illustration) is photoelectrically converted and then A(analog)/D(digital) converted, and the brightness value in the multi-level colors (256-colors, for example) for every pixel is taken into the image memory 4.

As the driver's license 40 is moved along the transport guide of the medium transporting mechanism of the image input section 2, the character pattern of the driver's license number (the OCR character line) printed in the license number (OCR character record) area P1 of the driver's license is read by a 1D imaging device and converted photoelectrically (Step ST1).

The data processing section 1 of the character recognition device 100 stores in the image memory 4 the brightness value of each pixel (the image data) contained in the image read by the image input section 2 (Step ST2).

Next, at the character recognition section 8, the characters are recognized from the image which has been read by the image input section 2 and stored in the image memory 4. First, at the character line segmentation section 81, the character line is segmented (Step ST3). The character line segmentation processing at the character line segmentation section 81 of this embodiment will be described in detail later referring to FIG. 7.

Next, at the character segmentation section 82, the characters are segmented (Step ST4). The character segmentation processing will be described in detail later associating with FIG. 8. Also, the character partitioning processing is described later in detail associating with FIG. 9.

Next, at the binarization processing section 823 of the character segmentation section 82, the character partitioning is implemented first and then the binarization processing is implemented for the character partitioning processing. Using the multi-level image data of the segmented item selection information (the license number area P1), the smallest pixel values are extracted from the pixel lines arranged in the perpendicular direction (Y-axis direction) orthogonal to the character line direction (X-axis direction) to create a minimum pixel-value curve. Based on the minimum pixel-value curve, the smallest pixel value is detected in the area having the linear drawing in the character line; having this smallest pixel value as a binarization threshold, a binarization processing is implemented.

Then, at the feature extracting section 83, feature extraction is implemented (Step ST5). More specifically described, at the feature extracting section 83, the area of the above-mentioned segmented character is divided into arbitrary numbers of sub sections (the area of the segmented character is divided into 5×5 sections, each of which is defined as a sub section, for example); with respect to each sub section, the ratio of the number of the black pixels to the number of the entire pixels in the sub section is acquired and then a feature vector having those as elements is produced.

Next, at the feature comparison section 84, feature comparison is implemented (Step ST6). More specifically described, at the feature comparison section 84, the feature vector acquired at Step ST5 is compared with the reference feature vector, which has been prepared for all the characters to be used on this medium and stored in the feature dictionary storage section 85 in advance, to set the character having the highest similarity (the normalized correlation coefficient) as a character candidate for the character.

Finally, character recognition is implemented (Step ST7). More specifically described, the character candidate set at the feature comparison at Step ST6 is recognized as the character used on the medium. Note that, when there are multiple character candidates whose similarity exceeds a fixed value, character recognition cannot be implemented; therefore, a similar character judgment is implemented at the similar character recognition section 86, using secondary feature values which can be derived from the feature vector.

For example, the arbitrarily-divided sub sections may be divided into two sections, a left half and a right half of the character, about vertical symmetry, a partial feature vector for each of the left half and right half may be composed and the similarity between the vectors may be analyzed. Also, when the arbitrarily-divided sub sections are divided into two sections, a top half and a bottom half, about horizontal symmetry, the similarity may be analyzed in the same manner as above. In the same manner as in the vertical symmetry and the horizontal symmetry, the similarity may be analyzed in a point symmetry.

Also, the character recognition device 100 of this embodiment can be applied not only to driver's license, but also to various media such as cards, passports, etc.

Note that the above-described method may be configured as a computer program created following the above-mentioned steps, which can be executed by a computer such as a CPU. Also, such a program can be configured to be accessed by a recording medium such as a semiconductor memory, a magnetic disk, an optical disc or a floppy disk (registered trade mark) or a computer in which a recording medium is set.

[Character Line Segmentation Processing]

Figure 7:
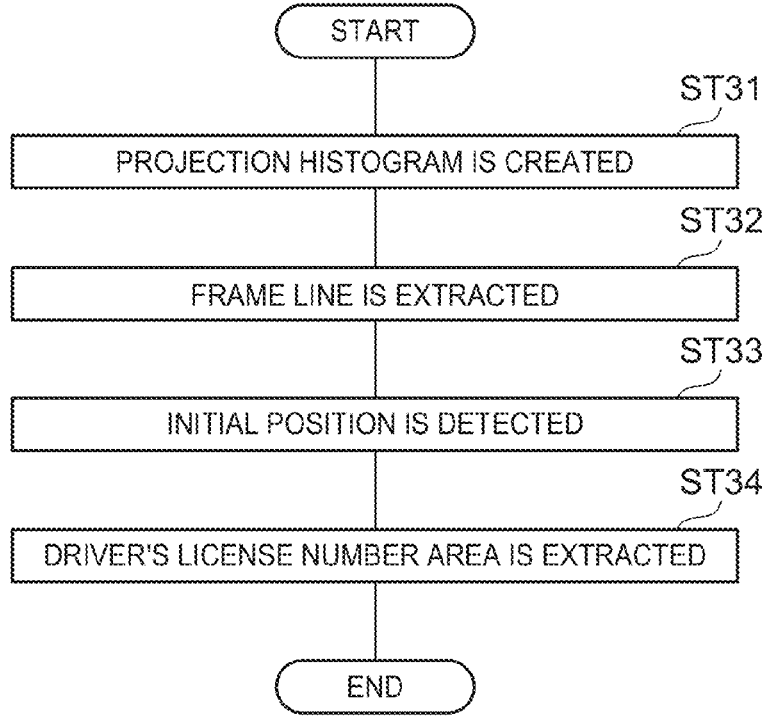
FIG. 7 is a flowchart of a character line segmentation process of the present embodiment.

Next, the character line segmentation is described referring to FIG. 7. FIG. 7 is a flowchart of the character line segmentation of this embodiment.

At the character line segmentation section 81, the projection histogram creating section 811 detects the entire projection of the multi-level image data of the entire driver's license 40 read by the image input section 2 and acquires the X-direction (horizontal direction) projection and the Y-direction (vertical direction) projection.

The projection histogram creating section 811 has an X-axis projection histogram creating section and a Y-axis projection histogram creating section, and detects the frame line f, which indicates the information recording area in the driver's license 40, by calculating a gray level histogram in the horizontal direction and the vertical direction. Note that, when there is no frame line f in the driver's license 40, the edge of the driver's license may be detected at the character line segmentation section 81. Also, the guide surface of the transporting means (the surface on which the driver's license 40 is placed) may be colored to distinguish the border position from the driver's license.

Next, at the character line segmentation section 81, the initial position detecting section 812 detects the frame line f of the driver's license 40 from the X-direction projection and the Y-direction projection to specify the area of the image of the driver's license 40 (Step ST32). The initial position detecting section 812 acquires the intersection of the extensions of the line component fx and the line component fy, which are the components of the frame line f, and detects the initial position f0 of the image data (Step ST33).

More specifically described, the initial position detecting section 812 has a frame line detecting section for detecting the frame line f of the driver's license 40 (the line component fx extending in the X-axis direction and the line component fy extending in the Y-axis direction) and an initial position detecting section for detecting the pixel which indicates the intersection (the original position) f0 of the extensions of the line component fx and the line component fy. For example, one pixel has a brightness value in 256 gray levels (8-bit) from "0" (black pixel) to "255" (white pixel). The pixel in the upper left corner in the image data is set as the initial point (0, 0). Using the coordinate in the X-axis direction and the Y-axis direction from the pixel in the initial point, the pixel positions (coordinates) in the four corners defining the area P1 in which the license number is printed are set.

Next, at the character line segmentation section 81, the character line segmentation implementing section 813 determines the license number area P1, in which the license number is printed, in the image data of the driver's license 40, and extracts the image data of the area P1 (Step ST34). The license number consists of 12 characters (12 digits) of a combination of the numbers from 0 to 9, as shown in FIG. 2. For example, in the driver's license 40 in FIG. 2, the license number is expressed by "Dai 123456789001 Go". Note that the number "1" on the right end is the first digit and expressed as c(1) and the number "1" on the left end is the 12th digit and expressed as c(12); the numbers in-between are expressed as c(2), c(3) . . . (c(11) from the right, for ease of explanation.

[Character Segmentation Processing]

Figure 8:
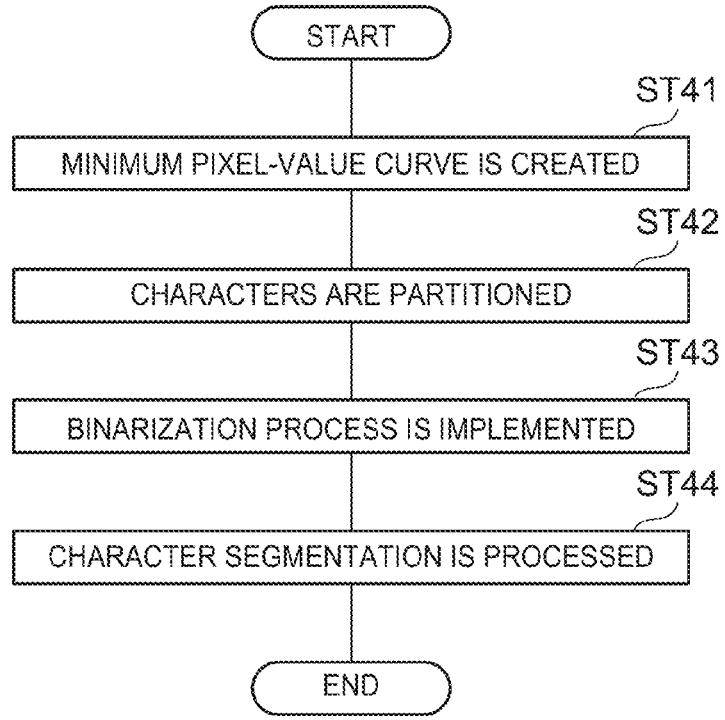
FIG. 8 is a flowchart of a character segmentation process of the present embodiment.

Next, character segmentation is further described referring to FIG. 8. FIG. 8 is a flowchart of character segmentation of this embodiment.

At the character segmentation section 82, the minimum pixel-value curve creating section 821 extracts the minimum pixel values in the pixels composing the pixel lines arranged in the vertical direction (Y-axis direction) orthogonal to the character line direction (X-axis direction) in the license number area P1 and creates a minimum pixel-value curve as shown in FIG. 12 (Step ST41)

In other words, the minimum pixel value is detected in the pixels (pixel line) arranged in the Y-axis direction (vertical direction) on a certain position Xa on the X-axis, and is acquired as the minimum pixel value at the position Xa. More specifically described, if there is even one pixel having the brightness value of 0, which indicates black, in the pixel line in which a character is printed, the minimum pixel value at the position Xa is 0; the minimum pixel value in the pixel line in which a character is not printed is white (255). The minimum pixel-value curve shown in FIG. 12 shows the minimum pixel value acquired for every pixel line in the X-axis direction. Also, in this embodiment, as shown in FIG. 2 and FIG. 11, the numbers from the fifth digit number c(5)="8" to the eighth digit number c(8)="5" in the license number are shaded with red oblique lines; since this shaded portion has less intensity of reflected light, it has a value brighter than 0 which indicates black when the image of this portion is converted to the multi-level image data.

At the character segmentation section 82, the character partitioning position determining section 822 calculates a temporary binarization threshold based on the minimum pixel-value curve, extracts the characters at both ends of the character line, and calculates the mid-point of each character based on the mid-points of the characters at both ends. After the edge positions that indicate the character width are detected from the mid-point of every character except the end characters, the number of characters is counted. Then, it is judged whether or not the number of characters in the license number area P1 agrees with the predetermined number (Step ST42). The character partitioning process is described in detail later.

After the character partitioning process is implemented at the character partitioning position determining section 822, a binarization processing for character segmentation is implemented at the binarization processing section 823 (Step ST43). Then, the character segmentation implementing section 824 extracts the image data of the bounding rectangular area of each character from which the linear drawing in the background is removed through the binarization process (Step ST44). The binarization process is also described in detail later.

[Character Partitioning Processing]

Figure 9:
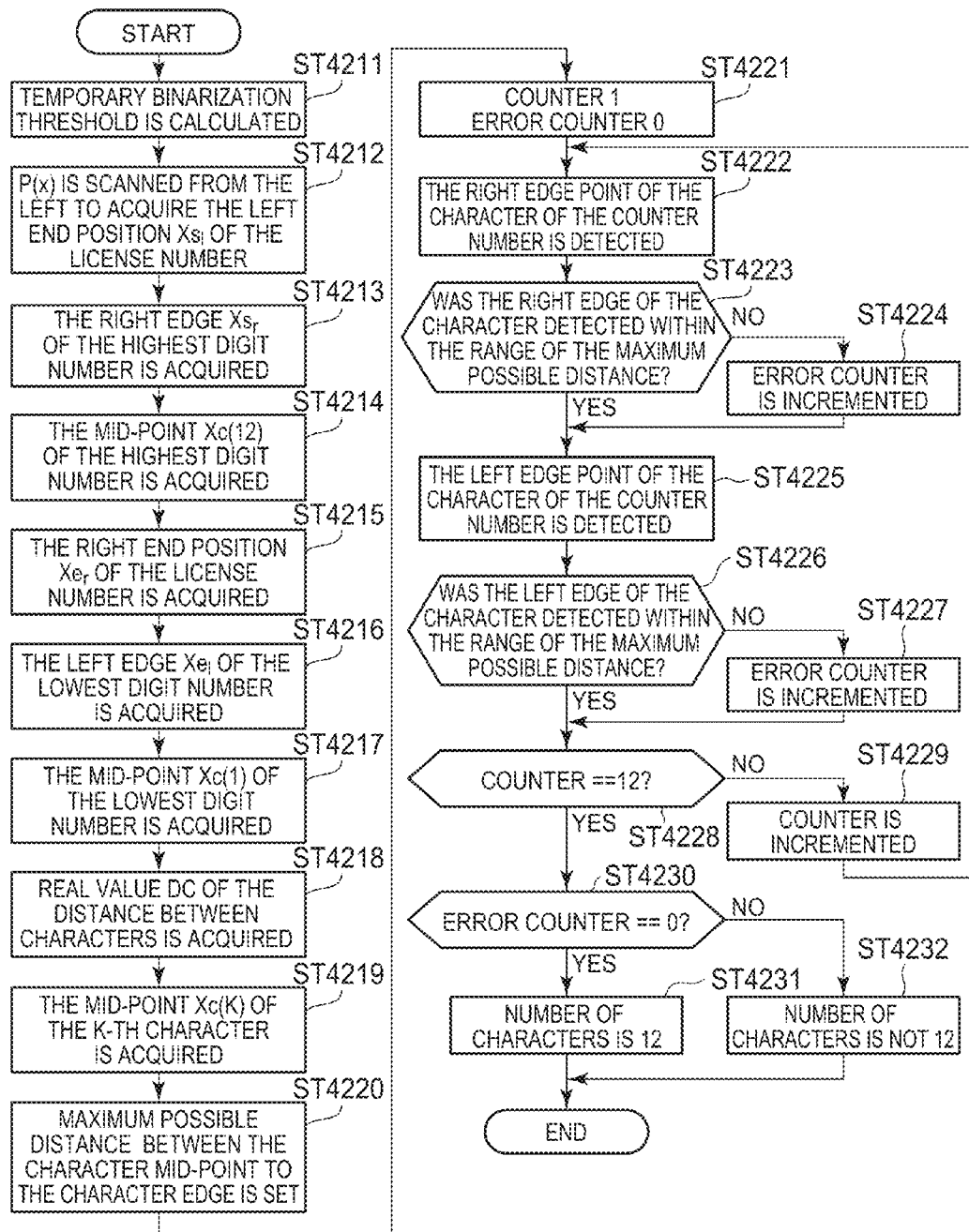
FIG. 9 is a flowchart of a character partitioning process of the present embodiment.

The character partitioning processing (Step S42) in FIG. 8 is described in detail referring to a flowchart in FIG. 9. FIG. 9 is a flowchart of the character partitioning processing of this embodiment.

First, at the character partitioning position determining section 822, a temporary binarization threshold calculating section calculates a temporary binarization threshold using the pixel value of every pixel contained in the rectangular image (see FIG. 11) of the segmented license number area P1 (Step ST4211). Note that, in this embodiment, the rectangular image shown in FIG. 11 is explained using the license number "123456789001" printed between the Chinese characters, "Dai" and "Go" in the area P1.

Binarization is implemented such that the character partitioning position determining section 822 scans the entire multi-level image data stored in the image memory 4 and first sets a threshold value for brightness to binarize the multi-level image data and then determines the pixel having a brightness value equal to or more than the threshold as a white pixel (the value of "1") and the pixel having a brightness value less than the threshold as a black pixel (the value of "0"). The method of setting a threshold value (such as a discriminant analysis method, a percentile method or a mode method) may be adopted from among those described on pp. 66-69 in "*Basics for Computer Image Processing*" by Hideyuki Tamura, Editor in Chief, Japan Industrial Technology Center, So-ken Publishing, 1988, for example. This embodiment has adopted a discriminant analysis method. In general, by a discriminant analysis method, the threshold (th) is set, assuming that a group of the pixels having different brightness values is classified into two classes by the threshold (th) (the threshold value, th, or more and less than the threshold value, th), such that the between-class variance is maximum. In this embodiment, the calculation has acquired the temporary binarization threshold, bth, equals to 50.

FIG. 12 is an example of a histogram created in the above manner. In FIG. 12, the horizontal axis indicates the positions 9 of the pixels in the image memory in the X-axis direction, and the vertical axis indicates the minimum pixel value in the pixels arranged in the X-axis direction. In this example, the black pixel value is "0" and the white pixel value is "255".

The end characters-extracting section scans the projection P(x) from the left and acquires the left end position Xs, of the license number (Step ST4212). In this embodiment, the end characters-extracting section starts the scanning of the projection P(x) from the left and keeps scanning until detecting the second position from the left, at which the minimum pixel value falls below the temporary binarization threshold (bth=50).

In other words, in the embodiment using the driver's license shown in FIG. 2, when scanned from the left, the license number has the Chinese character "Dai" on the left side of the license number, which is processed at the character line segmentation implementing section 813 and the level of the value (the minimum pixel value) falls below the threshold at this character position; therefore, the end characters-extracting section detects the second position from the left, at which the minimum pixel value drops below the temporary binarization threshold (bth=50), as the left end position of the license number. The end characters-extracting section sets the left end position of the number on the left end in FIG. 11, c(12)="1", as $Xs_l$.

Upon completion of the process of Step ST4212, the end characters-extracting section scans the projection P(x) starting at the position Xs, and acquires the right end position $Xs_r$ of the highest digit number (Step ST4213). The highest digit number is the number c(12)="1" on the left end in the license number shown in FIG. 11. More specifically described, the end characters-extracting section scans the projection P(x) starting at the position $Xs_l$ and sets the position at which the minimum pixel value exceeds the temporary binarization threshold (bth=50) as the right end position $Xs_r$.

Next, the character mid-point detecting section acquires the mid-point Xc(12) of the highest digit number by using the formula (1) below (Step ST4214).

$$Xc(12)=(Xs_l+Xs_r)/2 \qquad (1)$$

Next, the end character-extracting section acquires the right end position $Xe_r$ of the license number by using the formula (2) below (Step ST4215). In the formula (2), Dx is the value indicating the width of the 12-digit character line (license number) in the X-axis direction, and it is set in advance.

$$Xe_r = Xs_l + Dx \quad (2)$$

Next, the end character-extracting section scans the projection P(x) from the right, starting at the position $Xe_r$ and acquires the left edge position $Xe_l$ of the lowest digit number (Step ST4216). The lowest digit number means the number c(1)="1" on the right end of the license number shown in FIG. 11. In this process, the end character-extracting section scans the projection P(x) from the right, starting at the position Xer and sets the position at which the minimum pixel value exceeds the temporary binarization threshold (bth=50) as the left end position $Xe_l$.

Next, the character mid-point detecting section acquires the mid-point Xc of the lowest digit number by using the formula (3) below (Step ST4217).

$$Xc(1) = (Xe_l + Xe_r)/2 \quad (3)$$

Further, the character mid-point detecting section acquires the actual value Dc of the distance between the adjacent characters by using the formula (4) below (Step ST4218).

$$Dc = (Xc(1) - Xc(12))/11 \quad (4)$$

Next, the character mid-point detecting section calculates the mid-point Xc(k) of the character at the k-th digit between the 2nd digit and the 11th digit by using the formula (5) below (Step ST4219). Note that, in the formula (5) below, k=2, ... 11.

$$Xc(k) = Xc(1) - (k-1)*Dc \quad (5)$$

Then, the character mid-point detecting section sets the maximum possible distance from the character mid-point Xc(k) to the character edge for every character (Step ST4220). In this embodiment, the character mid-point detecting section sets the actual value Dc between the adjacent characters as the maximum possible distance.

Next, as the character end-position detecting section and the character counting section implement the process from Step ST4221 to Step ST4228, it is judged whether or not the number of the characters present in the license number area P1 is 12. In the process from Step ST4221 to Step ST4228, a counter indicates what number from the left is in process and an error counter indicates the number of errors. Also, the maximum possible distance is the longest possible distance from the mid-point to the right edge of the character. First, the character counting section sets 1 to the counter and 0 to the error counter (Step ST4221).

Next, the character edge detecting section scans the projection P(x) to the right direction from the mid-point Xc of the character indicated by the counter over the maximum possible distance and detects the position at which the brightness value exceeds the temporary binarization threshold to detect the right edge of the character indicated by the counter (Step ST4222).

In the process of Step ST4222, if the right edge of the character is not detected within the range of the maximum possible distance, it is judged as "No" in the Step ST4223 and the character counting section increments the error counter (Step ST4224).

Also, the character edge position detecting section scans the projection P(x) to the left from the mid-point Xc of the character, which the counter indicates, over the maximum possible distance and detects the position at which the brightness value exceeds the temporary binarization threshold to detect the left edge of the character indicated by the counter (Step ST4225). In the process of Step ST4225, if the left edge of the character is not detected within the range of the maximum possible distance, it is judged as "No" in Step ST4226 and the character counting section increments the error counter (Step ST4227).

Next, the character counting section judges whether or not the counter value is 12 (Step ST4228); when the judgment result is negative (Step ST4228; No), the counter is incremented (Step ST4229) and the process returns to Step ST4222.

On the other hand, when the judgment result in Step ST4228 is positive (Step ST4228; Yes), the character counting section judges whether or not the error counter is 0 (Step ST4230); when the error counter is 0 (step ST4230; Yes), it is judged that the number of characters is 12 (Step ST4231). When the error counter is not 0 (Step ST4230; No), it is judged that the number of characters is not 12 (Step ST4232).

[Binarization Processing]

After the character partitioning is implemented at the character partitioning position determining section 822, the binarization process for character segmentation is implemented at the binarization processing section 823.

As shown in FIG. 2 and FIG. 11, the numbers from the fifth digit number c(5)="8" to the eighth digit number c(8)="5" of the license number are shaded by red-colored oblique lines; since the portion with oblique lines has less intensity of the reflected light, this portion may also be detected as characters depending on the temporary binarization threshold, and accordingly the character detection may not properly be performed. Therefore, in order to detect characters properly, the binarization processing section 823 implements the following process to detect the minimum pixel value in the pixel values of the shaded portion and determines this minimum pixel value as the actual binarization threshold.

First, the binarization processing section 823 determines the above-mentioned temporary binarization threshold (bth=50) and judges the space of which the projection P(x) shows a pixel value higher than the temporary threshold, bth, as a blank space. The blank space is thought to be a space between a character (number) and an adjacent character (number). In other words, this blank space has no pixels that indicates a character, and the only other possibility is that it has either a pixel value indicating the portion with oblique lines or a pixel value indicating the portion without oblique lines.

Next, the binarization processing section 823 acquires the minimum pixel value in each blank space from the projection P(x). In FIG. 12, the space, S1 to S12, is a character space in which an individual number of the license number is printed, and the space between S1 and S2, for example, is a blank space in which no character (number) is printed. Then, in this embodiment, the minimum pixel value of each space between S4 and S5, between S5 and S6, between S6 and S7, and between S7 and S8 in the portion from the fifth digit number c(5)="8" to the eighth digit number c(8)="5" which are the shaded portion with oblique lines is detected. After the minimum pixel value of each space is detected, the binarization processing section 823 detects the smallest pixel value of all the pixels in these spaces. Then, the binarization processing section 823 uses this smallest value as binarization threshold.

According to this embodiment, the smallest pixel value in the projection P(x) for the spaces including the portion with oblique lines is used as the binarization threshold; therefore, it is guaranteed that the portion with oblique lines has the pixel values exceeding the binarization threshold. For this reason, there is no chance that the portion with oblique lines will be detected as a character space.

In the above-described embodiment, the oblique lines shading over the characters in the license number may be removed after the processing at the character partitioning position determining section 822. The processing method in this case is described referring to FIG. 10 through FIG. 13.

FIG. 11 is an explanatory figure showing an example of the image of the driver's license number. As shown in FIG. 2 and FIG. 11, the section from the fifth digit number c(5)="8" to the eighth digit number c(8)="5" in the license number is shaded with red oblique lines. The binarization process which removes the oblique lines and segments the characters is described below.

Figure 10:
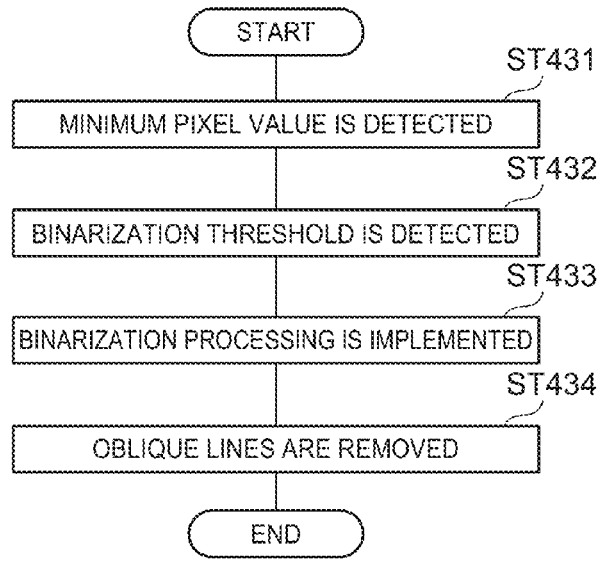
FIG. 10 is a flowchart of a binarization process of the present embodiment.

FIG. 10 is a flowchart of the binarization processing of this embodiment. In the minimum pixel-value detecting step, the minimum pixel values in the blank spaces (especially, the blank spaces between S4 and S5, . . . and between S7 and S8 which are shaded with oblique lines) in FIG. 12 are detected. The X-projection here is not a normal X-projection, but is acquired through a special projection calculation. In other words, the projection calculating section calculates the minimum pixel value at the straight line x=i by Smin (X)=min (S(i, X)) where the image of the character area is expressed by S(i, j). FIG. 12 shows this Smin(X) (Step ST431).

In a binarization threshold detecting step, the binarization threshold is acquired based on Smin (x). In the binarization threshold detecting step, a temporary binarization threshold, bth, is first determined. For example, bth=50 (see FIG. 12). At the binarization threshold detecting step, when the function value of Smin (x) falls below bth, that section is judged as a character space B; when the function value exceeds bth, that section is judged as a blank space W. The oblique lines are applied to the portion from the fifth character to the eighth character; paying attention to the relationship between the oblique lines and Smin (X), it is understood that the function value for the blank space with oblique lines is smaller than that for the blank space without oblique lines in FIG. 12. The minimum pixel value of Smin (X) is acquired with respect to the five consecutive blank spaces which are shaded with oblique lines (the shaded portion in FIG. 12: between S4 and S5, . . . between S7 and S8), and set this minimum pixel value as the binarization threshold, BinThresh. In the example of FIG. 12, BinThresh equals to 52 (Step ST432).

Figure 13:
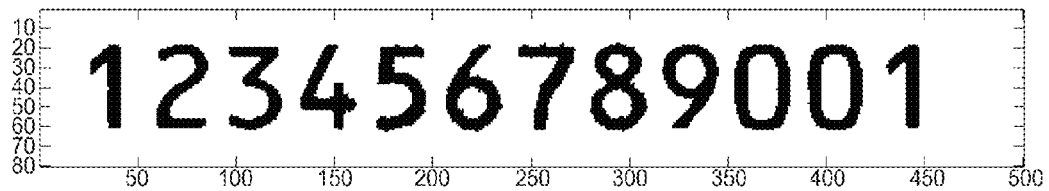
FIG. 13 is a figure showing an example of the image of the driver's license on which oblique line elimination processing is performed.

In the binarization processing step, the image of the character printed area is binarized using this binarization threshold, BinThresh (Step ST433). Consequently the image shown in FIG. 13 is acquired. As shown in FIG. 13, it is understood that the oblique lines in the original image of the character area are removed through binarization. In this method, the minimum pixel value of the portion with oblique lines is acquired and set as the binarization threshold; therefore, it is guaranteed that the pixel value of the portion with oblique lines exceeds the threshold value. Therefore, the pixels of the oblique lines won't be mapped in a black area through binarization, and accordingly a binarization desirable for character recognition can be implemented (Step ST434).

(Major Effects of the Embodiment)

When reading a character line which is shaded with oblique lines on a driver's license as image data for character recognition, the character segmentation device and the character segmentation method of at least an embodiment of the present invention do not need an operation to rotate the image data, i.e., a coordinate transformation; therefore, the operation load is lessened while the cost of device is kept low and the processing time is shortened. Also, this device does not need to be equipped with a dictionary for rotated characters; therefore, an extra storage space is not necessary. Further, in at least an embodiment of the present invention, the minimum pixel value of the oblique lines in the blank space which exists between characters is acquired and used as the threshold; therefore, it is guaranteed that the pixels of the oblique lines won't be mapped in the black area, and therefore, a binary image desirable for character recognition can be obtained.

Other Embodiments

The above-described embodiment is one example of the embodiments of the present invention, and may be modified in the following manner. Also, the above-described embodiment and modification examples described below may be combined as necessary.

In the above-described embodiment, when the license number is present in the license number area P1, the direction of this image is called "the erected direction"; when the image is rotated at 180 degrees and therefore the license number is positioned in the area P2, such direction is called the "inverted direction". In this embodiment, it is assumed that the driver's license is inserted in the right direction; however, when the license is inserted in a wrong direction, the license number won't be present in the license number area P1; in this case, it may be judged that the direction of the driver's license is wrong.

In the above-described embodiment, the character recognition section 8 may be realized so that the control section 5 reads and executes a computer program stored in a storage medium such as the storage section 6. In such a case, this computer program may be provided and saved in a computer-readable recoding medium such as a magnetic recording medium (a magnetic tape, a magnetic disk, an HDD (Hard Disk Drive), an FD (Flexible Disk)), an optical recording medium (an optical disk), a photomagnetic recording medium or a semiconductor memory. Also, the program may be downloaded through a communication line such the internet on a character recognition device which is the character segmentation device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A character segmentation section, for segmenting characters of a character line, for use in a character segmentation device which processes multi-level image data acquired by imaging said character line, in which a linear drawing is present, on an information recording medium said character segmentation section comprising:

a minimum pixel-value curve creating section configured to extract a smallest pixel value in pixels composing a pixel line arranged in a direction orthogonal to a character line direction in said multi-level image data and create a minimum pixel-value curve, a character partitioning position determining section configured to determine partitioning positions of said characters, based on said minimum pixel value curve, a binarization processing section configured to detect a minimum pixel value indicating said linear drawing from said minimum pixel-value curve, acquires a binarization threshold based on said minimum pixel value, and binarizes said multi-level image data using said binarization threshold, and a character segmentation implementing section configured to extract the image data of each character.

2. The character segmentation device as set forth in claim 1, wherein said binarization processing section detects a minimum pixel value in said minimum pixel-value curve for a blank space provided between characters and binarizes said multi-level image data using said minimum pixel value as a binarization threshold.

3. The character segmentation device as set forth in claim 1, wherein said character partitioning position determining section calculates a temporary binarization threshold, binarizes said multi-level image data, and determines the boundary between a character space in which a character is printed and an adjacent blank space provided between characters, based on said binary image data.

4. A character segmentation method for processing multi-level image data acquired by imaging a character line, in which a linear drawing is present, on an information recording medium to segment characters composing said character line, the character segmentation method comprising:

extracting the smallest pixel value in pixels composing a pixel line arranged in the direction orthogonal to the character line direction in said multi-level image data and creating a minimum pixel-value curve;

determining partitioning positions of said characters based on said minimum pixel value curve;

detecting a minimum pixel value indicating said linear drawing from said minimum pixel curve, acquiring a binarization threshold based on said minimum pixel value and binarizing said multi-level image data using said binarization threshold; and extracting the image data of each character.

5. The character segmentation method as set forth in claim 4, wherein in said detecting a minimum pixel value, a minimum pixel value in said minimum pixel-value curve for a blank space provided between characters is detected, and said multi-level image data is binarized by using said minimum pixel value as binarization threshold.

6. The character segmentation method as set forth in claim 4, wherein in said determining partitioning positions of said characters, a temporary binarization threshold is calculated and said multi-level image data is binarized using said temporary binarization threshold, and a boundary between a character space in which a character is printed and an adjacent blank space provided between characters is determined, based on said binary image data.

* * * * *